United States Patent [19]

Kuwabara

[11] Patent Number: 4,475,334
[45] Date of Patent: Oct. 9, 1984

[54] METHOD OF AND SYSTEM FOR CONTROLLING HYDRAULIC TURBINE

[75] Inventor: Takao Kuwabara, Hitachi, Japan
[73] Assignee: Hitachi, Ltd., Tokyo, Japan
[21] Appl. No.: 290,258
[22] Filed: Aug. 5, 1981
[30] Foreign Application Priority Data
 Aug. 13, 1980 [JP] Japan ............... 55-110248
[51] Int. Cl.³ ............................... F01B 25/04
[52] U.S. Cl. ............................... 60/398; 415/26; 415/29; 415/43; 290/43; 290/54
[58] Field of Search ........... 60/327, 398; 290/52, 290/54, 43; 415/26, 29, 43

[56] References Cited
U.S. PATENT DOCUMENTS

| | | | |
|---|---|---|---|
| 2,495,604 | 1/1950 | Salzmann | 290/52 X |
| 2,724,082 | 11/1955 | Hornfeck | 290/52 |
| 3,546,472 | 12/1970 | Hoffman | 290/52 |
| 3,886,373 | 5/1975 | Okada | 290/52 |
| 3,906,726 | 9/1975 | Jamesen | 60/327 |

FOREIGN PATENT DOCUMENTS 399609 10/1933 United Kingdom ........... 60/327

*Primary Examiner*—Allen M. Ostrager
*Attorney, Agent, or Firm*—Beall Law Offices

[57] ABSTRACT

A method of and system for controlling a hydraulic turbine including a variable throttle valve located in fluid channel upstream or downstream of the hydraulic turbine adapted to be closed simultaneously as guide vanes of the hydraulic turbine are closed at a velocity higher than a predetermined velocity. The variable throttle valve is closed to a certain degree of opening in response to the sudden closing action of the guide vanes, but slowly opened to an original full open position after the guide vanes has closed to a predetermined degree of opening.

26 Claims, 6 Drawing Figures

METHOD OF AND SYSTEM FOR CONTROLLING HYDRAULIC TURBINE

BACKGROUND OF THE INVENTION

This invention relates to methods of and systems for controlling a hydraulic turbine, such as a turbine or a reversible pump-turbine during operation thereof, and more particularly it is concerned with a control method and system of the type described which has particular utility for controlling the operation of a hydraulic turbine spaced apart a long distance from upper and lower reservoirs or having an elongated headrace and a tailrace.

A hydraulic generating station of the prior art comprises an upper reservoir, a penstock connected to the upper reservoir through an inlet gate, a turbine connected to the penstock through an inlet valve, a draft tube connected to the turbine, a draft gate at an outlet of the draft tube, a lower reservoir and a generator driven by the turbine. The turbine comprises a runner and a plurality of movable guide vanes around the runner, the guide vanes serving as flowrate control means for controlling the flowrate of water flowing through the turbine. In normal turbine operation, the inlet gate, inlet valve and draft gate are set at respective predetermined openings, and the flowrate of water introduced into the turbine is controlled only by the guide vanes. More specifically, changes in the speed of the generator resulting from changes in the load of the generator are sensed to open and close the guide vanes in accordance with variations in the load, to thereby control the flowrate of water introduced into the turbine.

In a hydraulic generating station of this construction, a sudden drop in the load of the generator causes the guide vanes to be immediately closed to reduce the flowrate of the water inflow in accordance with the variation in the load. In such case, a sudden drop in the flowrate of the water inflow causes a sudden rise in pressure on the upstream side of the turbine and a sudden drop in pressure on the downstream side thereof. The rise in pressure ($\Delta P_U$) and the drop in pressure ($\Delta P_L$) generally have the following relation:

$$\Delta P_U = k \cdot L_U \cdot \frac{\Delta V_U}{\Delta t} \quad (1)$$

$$\Delta P_L = k \cdot L_D \cdot \frac{\Delta V_L}{\Delta t} \quad (2)$$

where
k: constant.
$L_U$: length of penstock.
$\Delta V_U$: change in flow velocity in penstock.
$L_D$: length of draft tube.
$\Delta V_L$: change in flow velocity in draft tube.
$\Delta t$: a short time interval.

As is clearly seen in equations (1) and (2), the larger the lengths of the penstock and draft tube, the higher are the rise and the drop in pressure. It is essential that the penstock be manufactured with a thickness large enough to have sufficient strength to withstand the sudden rise in pressure. The sudden drop in pressure in the draft tube has the possibility of giving rise to the phenomenon of water column separation which is not desirable. Thus closing of the guide vanes too fast must be carefully avoided.

To reduce the variations that might occur in hydraulic pressure, various proposals have hitherto been made. They include:

1. To close (or open) guide vanes at a sufficiently low velocity.
2. To provide the turbine with a bypass water passage mounting a flowrate control valve operative to open and close as opposed to the guide vanes;
3. To increase the diameters of the penstock and the draft tube to reduce velocity of the water flow; and
4. To provide the water channel system with a surge tank.

None of these proposals of the prior art for reducing the variations that might occur in hydraulic pressure have necessarily been successful, more specifically, even if they are satisfactory in either respect, performance or cost, they are not necessarily successful in the other respect and they leave much to be desired for the simultaneous satisfaction.

SUMMARY OF THE INVENTION

This invention has been developed for the purpose of obviating the aforesaid disadvantages of the prior art. Accordingly an object of the present invention is to provide a method of and a system for controlling a hydraulic turbine during its operation capable of effectively and economically reducing variations in the hydraulic pressure in the water channel.

Another object of the present invention is to provide a method of and a system for controlling a hydraulic turbine during its operation that is operative to impart a throttling action to the stream upstream or downstream of the guide vanes in conjunction with the operation of closing the guide vanes.

Still another object of the present invention is to provide a method of and a system for controlling a hydraulic turbine during its operation, comprising at least one variable throttle means mounted in the water channel upstream or downstream of the guide vanes and adapted to be closed simultaneously as the guide vanes are closed, at a velocity commensurate with the velocity at which the guide vanes are moved to a closed position.

Still another object of the present invention is to provide a method of and a system for controlling a hydraulic turbine during its operation, wherein the variable throttle means is closed only when the closing velocity of the guide vanes exceeds a predetermined value.

A further object of the present invention is to provide a method of and a system for controlling a hydraulic turbine during its operation, wherein the variable throttle means remains open when the closing velocity of the guide vanes is below a predetermined value, to thereby keep the variable throttle means in a full open position during the turbine normal operating condition.

Additional and other objects, features and advantages of the invention will become apparent from the description set forth hereinafter when considered in conjunction with the accompanying drawings.

DETAILED DESCRIPTION OF THE PREFERRED EMBODIMENTS

Figure 1:
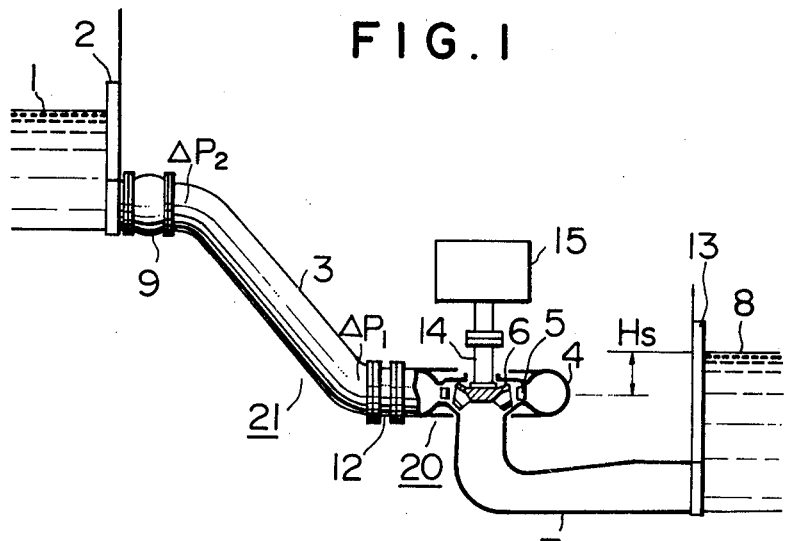
FIG. 1 is a schematic view of a hydraulic power generating plant incorporating therein a first embodiment of the invention.

Referring to FIG. 1, the hydraulic power generating plant comprises a turbine 20 located in a water channel connecting an upper reservoir 1 with a lower reservoir 8, and a generator 15 driven by the turbine 20. The turbine 20 comprises a casing 4, a runner 6 disposed inwardly of the casing 4, flowrate control means including a plurality of guide vanes 5 interposed between the casing 4 and runner 6 for controlling the flowrate of water from the casing 4 to the runner 6, and a shaft 14 for transmitting the rotation of the runner to the generator 15. The vanes 5 are driven by drive means subsequently to be described so that they automatically close and open in accordance with a variation in the load of the generator 15.

The casing 4 of the turbine 20 is connected through a penstock 3 with the upper reservoir 1 and through a draft tube 7 with the lower reservoir 8. The upper reservoir 1 and lower reservoir 8 are provided with an inlet gate 2 and a draft gate 13 respectively. An inlet valve 12 is mounted between the penstock 3 and the turbine 20. The construction described hereinabove is known and its detailed description will be omitted.

According to the invention, a first embodiment comprises a variable throttle valve 9 mounted on the upstream end of the penstock 3 and adapted to be controlled by a control system subsequently to be described so that it closes simultaneously as the guide vanes 5 are closed, to thereby impart a throttling action to the stream of water flowing therethrough. Prior to the description in detail of the variable throttle valve 9, the principle of avoiding a sudden rise in hydraulic pressure by means of the variable throttle valve 9 will be described.

As described hereinabove, the throttle valve 9 is closed simultaneously as the guide vanes 5 are closed. Thus an abrupt throttling action is imparted to the stream of water in the penstock 3 at opposite ends or upper and lower ends thereof. This throttling action causes a rise in hydraulic pressure $\Delta P_1$ immediately upstream of the guide vanes 5 and a drop in hydraulic pressure $-\Delta P_2$ immediately downstream of the throttle valve 9. When no throttle valve 9 is provided or when a throttling action is imparted by the guide vanes 5 alone to the stream to suddenly reduce its flowrate, the following relation holds:

$$\Delta P_1 - (-\Delta P_2) = \Delta P_1 + \Delta P_2 = \Delta P_0 \qquad (3)$$

where $\Delta P_0$ is the required total pressure change working on the water column for its deceleration. As can be seen in equation (3), the rise in hydraulic pressure $\Delta P_1$ in the penstock 3 is lower, when the throttle valve 9 is provided to cause the drop in hydraulic pressure $-\Delta P_2$, than the rise in hydraulic pressure $\Delta P_0$ obtained when no throttle valve 9 is provided. When the closing velocity of the throttle valve 9 and the closing velocity of the guide vanes 5 are rendered equal to each other, the following relation holds:

$$|\Delta P_1| \approx |\Delta P_2| \qquad (4)$$

Hence $$\Delta P_1 \approx 0.5 \Delta P_0 \qquad (5)$$

This means that the rise in hydraulic pressure produced in the penstock 3 is about one-half the rise produced in hydraulic power generating plants of the prior art.

When $L_U = 1800$ m, $V = 8$ m/sec and the effective head = 360 m, for example, assume that the guide vanes 5 are closed in 6 seconds. $\Delta P_0$ will be about 360 m and it will be necessary to increase the strength of the penstock 3 so that it is able to withstand a hydraulic pressure of about twice the hydrostatic pressure in the prior art. However, if the throttle valve 9 is mounted and closed at the same velocity at which the guide vanes 5 are closed, $\Delta P_1$ will be about 180 m and the penstock 3 will have to withstand a hydraulic pressure of about 1.5 times the hydrostatic pressure. Stated differently, with the energy of water in the penstock 3 being substantially equally borne by the throttle valve 9 at the upstream end and by the guide vanes 5 at the downstream end, there is only produced a rise in pressure which corresponds to the hydraulic energy for half the length of the penstock 3. Thus the result achieved is tantamount to that obtained by reducing the length of the penstock 3 to ½.

Figure 2:
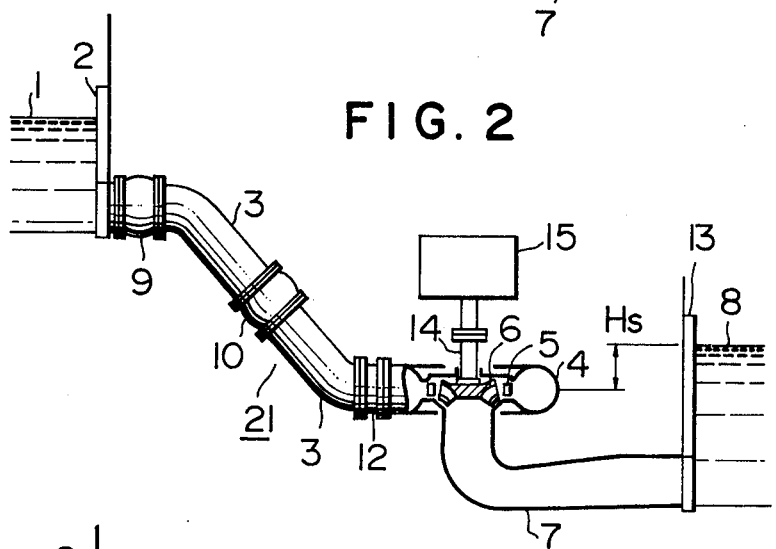
FIG. 2 is a schematic view of a hydraulic power generating plant incorporating therein a second embodiment.

FIG. 2 shows a second embodiment comprising a second variable throttle valve 10 mounted midway in the penstock 3 and adapted to close in conjunction with the closing operation of the guide vanes 5. It will be seen that the result achieved is tantamount to that obtained by reducing the length of the penstock 3 to ½.

Figure 3:
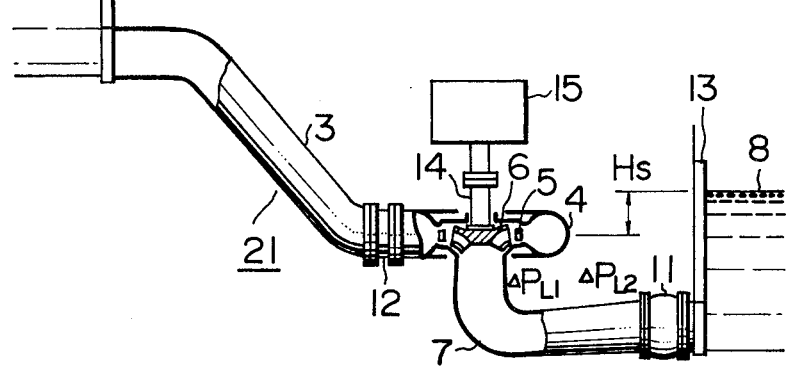
FIG. 3 is a schematic view of a hydraulic power generating plant incorporating therein a third embodiment.

FIG. 3 shows a third embodiment comprising a third variable throttle valve 11 mounted at the downstream end of the draft tube 7. In this embodiment, the guide vanes 5 and variable throttle valve 11 are simultaneously closed, producing $-\Delta P_{L1}$ immediately downstream of the turbine 20 and $+\Delta P_{L2}$ immediately upstream of the variable throttle valve 11. The composite pressure of $-\Delta P_{L1}$ and $+\Delta P_{L2}$ or $-(\Delta P_{L1} + \Delta P_{L2})$ corresponds to a pressure drop $-\Delta P_{L0}$ which would be produced downstream of the turbine 20 when no throttle valve 11 were provided.

That is, $-\Delta P_{L1} = -(\Delta P_{L0} - \Delta P_{L2})$, thereby greatly reducing the pressure drop produced downstream of the turbine 20. This is tantamount to essentially reducing the length of the tailrace.

It is also possible to avoid the possibility of the phenomenon of water column separation, and this means that a draft head Hs need not be reduced in length. Thus the position of the turbine and the draft tube can be raised, thereby enabling excavation expenses to be greatly reduced.

It will be understood that the variable throttle valves 9-11 may be of any number N as desired and mounted in any position as desired in a water channel 21, to achieve the desired effects. Since difficulties would be experienced in mounting the throttle valve midway in the penstock 3 in the case of an underground generating plant, for example, preferably the throttle valves are mounted on the upstream end of the penstock 3 and/or the downstream end of the draft tube 7, as shown in FIGS. 1 and 3 respectively.

It will be apparent that the achieved effects would be reduced when the single throttle valve is mounted too close to the turbine 20, from the standpoint of sharing the hydraulic energy or minimizing a rise in hydraulic pressure. Thus preferably the throttle valve is mounted at the upstream end of the penstock 3, or at the downstream end of the draft tube 7. That is, each of the two flowrate throttle means could most effectively bear $\frac{1}{2}$ the hydraulic energy and consequently it could most effectively bear $\frac{1}{2}$ the rise in hydraulic pressure.

The variable throttle valve and a control system therefor will now be described by referring to FIG. 4. The throttle valves 9–11 and the control systems therefor are of the same construction, so that the variable throttle valve 9 and the control system therefor will be described in detail.

The variable throttle valve 9 comprises a cylindrical valve body 100 extending axially and having an inlet port and an outlet port at opposite ends. The valve body 100 is composed of a first body 102 located on the upstream side and a second body 103 connected to the downstream end of the first body 102. The first body 102 has a guide 102A located concentrically therein, and an annular passage 150 defined between the outer peripheral surface of the guide 102A and the inner peripheral surface of the first body 102. The guide 102A is unitarily connected to the first body 102 by a plurality of ribs 102B, and extending radially and axially. The guide 102A supports therein an axially slidable valve plug 101 in which in turn is disposed a cylinder 105 concentrically positioned and remaining stationary. The cylinder 105 has inserted therein a reciprocatory piston 104 having connected thereto a piston rod 104C formed with a needle 104A at its forward end, and another piston rod 104D. The valve plug 101 is cylindrical at its upstream end and its wall converges conically toward its downstream end which is formed at its center with an opening 101C which faces at its inner surface the outer surface of the needle 104A. The valve plug 101 has two projections 101A and 101B suitably spaced apart from each other axially and extending inwardly from the inner wall surface. A disc 104B secured to the piston rod 104C is interposed between the two projections 101A and 101B with a suitable spacing between the disc and the projection. The projections 101A and 101B and the disc 104B are relatively positioned in such a manner that when the piston rod 104C moves rightwardly to allow the needle 104A to block the opening 101C the disc 104B abuts against the rightside projection 101A, and that when the piston rod 104C moves leftwardly to bring the needle 104A out of blocking engagement with the opening 101C the disc 104B abuts against the leftside projection 101B.

A projection 102C for supporting the cylinder 105 located inside the guide 102A is formed with apertures 102D to allow water under pressure introduced into the guide 102A through openings 102E at the upstream end of the guide 102A to flow through apertures 101B1 and 101A1 formed in the projections 101B and 101A respectively, to be released from the guide 102A through the opening 101C.

The first body 102 is formed at its upstream end with a flange 102F for connection with the penstock 3 or draft tube 7. The second body 103 connected to the downstream end of the first body 102 is formed on its inner wall surface with a valve seat 103A adapted to cooperate with the conical surface of the downstream end portion of the valve plug 101 to give a throttling action to the stream depending on the position of the valve plug 101. The second body 103 is formed at its downstream end with a connecting flange 103B.

The piston rod 104D extends into a space 102G formed in one of the radial ribs 102B and has connected to one end thereof a wire 106 which is trained over a pulley 106A arranged in the space 102G and another pulley 106B located outside and close to the throttle valve 9, to be connected to a weight 106C. A potentiometer 107 is connected to the pulley 106B. Thus the movement of the piston 104 is transmitted through the piston rod 104D, wire 106 and pulley 106B to the potentiometer 107 which detects the position of the piston 104.

The cylinder 105 has connected to its opposite ends lines 151 and 152 (shown in broken lines) respectively which are connected to a pressure fluid distributing valve 122 operative to exhaust pressure fluid from the pressure fluid line 152 when it supplies pressure fluid to the pressure fluid line 151 and to exhaust pressure fluid from the pressure fluid line 151 when it supplies pressure fluid to the pressure fluid line 152. Thus the pressure fluid distributing valve 122 is able to move the piston 104 both rightwardly and leftwardly. It will be understood that the piston 104 and cylinder 105 constitute a double-action pressure fluid means.

The pressure fluid distributing valve 122 comprises a valve chamber 123, and a plunger 124 slidable in the valve chamber 123. The valve chamber 123 is formed with an inlet port 123A in the central portion of its side wall, ports 123B and 123C disposed on respective opposite sides of the inlet port 123A, and outlet ports 123D and 123E at upper and lower ends respectively. The inlet port 123A is connected to a pressure fluid source for receiving a pressure fluid $P_{ol}$; the ports 123B and 123C are connected to the lines 151 and 152 respectively; and the outlet ports 123D and 123E are connected to drains $P_{Dl1}$ and $P_{ol2}$ respectively. The plunger 124 has lands 124B and 124C disposed in positions corresponding to the ports 123B and 123C respectively. When the plunger 124 is in a neutral position as shown, the lands close the corresponding ports. When the plunger 124 moves slightly downwardly from the position shown in the figure, the inlet port 123A is brought into communication with the port 123B, to allow the pressure fluid $P_{ol}$ to be distributed through the port 123B to the line 151. From the line 151, the fluid is fed to a chamber leftwardly of the piston 104 in the cylinder 105. Meanwhile the port 123C is communicated with the exhaust port 123E, to allow the fluid in a chamber rightwardly of the piston 104 in the cylinder 105 to be exhausted therefrom through the line 152. This moves the piston 104 rightwardly. The velocity of movement of the piston 104 is proportional to the flowrate of pressure fluid supplied to the line 151 which in turn is determined by the opening of the port 123B or the position of the land 124B relative to the port 123B. Stated differently, the piston 104 is moved rightwardly at a velocity which may vary depending on the displacement of the plunger 124 from its neutral position. Meanwhile, upward movement of the plunger 124 from the illustrated position allows the pressure fluid $P_{ol}$ to be fed to the line 152 and exhausts the fluid from the line 151, to thereby move the piston 104 leftwardly. At this time too, the velocity of movement of the piston 104 may vary depending on the diplacement of the plunger 124 from its neutral position.

Located on the pressure fluid distributing valve 122 is a servomotor 130 for driving the plunger 124, which comprises a valve chamber 131 and a piston 132 slidably fitted in the valve chamber 131. The piston 132 has its underside connected to the plunger 124 through a relatively thin rod 133, and its upper surface has connected thereto a relatively thick piston rod 134 extending outwardly of the valve chamber 131. Thus the piston has a smaller effective pressure receiving area at its upper surface than its underside, so that when the same pressure is applied to the upper and the underside of the piston 132, the piston 132 moves upwardly. The valve chamber 131 is formed with an inlet port 131A opening in a portion of the chamber 131 above the piston 132 for allowing a pressure fluid $P_{02}$ to be supplied therethrough into the chamber at all times, and with a port 131B opening in a portion of the chamber 131 below the piston 132 and connected to a pilot valve 140 via a line 153.

The pilot valve 140 comprises a pilot plunger 141 and a pilot bushing 142. The plunger 141 has three lands 141A, 141B and 141C, and the bushing 142 is formed with an inlet port 142A through which a pressure fluid $P_{03}$ is supplied at all times, a port 142B connected to the line 153, and an outlet port 142C connected to a drain $P_{D2}$. Movement of the plunger 141 relative to the bushing 142 brings the port 142B into communication with either the port 142A or 142C, to thereby supply the pressure fluid $P_{03}$ to a space below the piston 132 or discharge the pressure fluid therefrom.

The plunger 141 of the pilot valve 140 is connected to an electromagnet 110. More specifically, the electromagnet 110 comprises a stationary magnet 111, a movable coil 112 arranged to face the magnet 111 in a horizontal direction, and a spring 113 for keeping the movable coil 112 in a predetermined position or a neutral position when a signal supplied thereto is 0. The movable coil 112 is of the type that can be displaced in accordance with the size of the input signal. The movable coil 112 is connected to the pilot plunger 141, to enable the latter to shift to a position commensurate with the size of the input signal supplied to the movable coil 112. The movable coil 112 is supplied with a signal Ec from a calculator-amplifier 108 which in turn receives a signal Es from signal generating means combined with guide vane drive means as subsequently to be described and a signal Ef from the potentiometer 107. The signal Ec generated by the calculator-amplifier 108 is proportional to the sum of the signals Es and Ef. The electromagnetic coil 112 is disposed in the neutral position as shown when the input signal Ec is 0. When the input signal Ec is negative, the electromagnetic coil 112 moves downwardly below the illustrated position, and when positive, it moves upwardly above the illustrated position, for an amount corresponding to the size of the signal Ec.

The pilot bushing 142 is supported by a frame 114 for vertical movement too, and its upper end is forced by the biasing force of a spring 115 against a receiver 117B in an intermediate position of a lever 117 which is pivotally supported at one end or right end as indicated at 116A by a stationary bracket 116 and connected at the other end or left end to the upper end of a rod 134 of the servomotor 130 through a connecting rod 118. Thus the lever 117 moves in pivotal movement about the pivot 116A on the bracket 116, so that the displacement of the pilot bushing 142 is proportional to the displacement of the piston 132 of the servomotor 130 and hence to the displacement of the plunger 124 of the pressure fluid distributing valve 122 at all times. Stated differently, the position of the plunger 124 corresponds to that of the pilot bushing 142 at all times. Assume that the pilot plunger 141 moves downwardly from the illustrated position for a very small distance l. This brings the port 142B into communication with the outlet port 142C, to evacuate the space below the piston 132 to move the piston 132 downwardly. The downward movement of the piston 132 is fed back by the lever 117 to the pilot bushing 142, which moves a distance equal to the distance covered by the movement of the pilot plunger 141. This causes the port 142B to be closed by the land 141B, thereby stopping the movement of the piston 132. In this way, the piston 132 moves a distance proportional to the distance l covered by the movement of the pilot plunger 141. As aforesaid, the pilot plunger 141 is connected to the electromagnetic coil 112 and the piston 132 is connected to the plunger 124 of the pressure fluid distributing valve 122, so that the distance covered by the movement of the plunger 124 is proportional to the amount of movement of the electromagnetic coil 112.

Secured to the connecting rod 118 connected to the upper end of the servomotor 130 is a disc 118A which has on opposite sides thereof a pair of bolts 121 attached to a stationary frame, each bolt 121 supporting two nuts 119 and 120. The nuts 119 and 120 are stoppers for restricting the upper and lower movements of the disc 118A respectively, to thereby limit the range of upward and downward movements of the plunger 124. The lower limit of the movement of the plunger 124 is a position in which it opens the port 123B sufficiently wide to bring it into communication with the line 151, and the upper limit thereof is a position in which the port 123C communicating with the line 152 is partly closed by the land 124C to thereby restrict the pressure fluid volume supplied to the line 152. This enables the valve plug 101 of the throttle valve 9 to move rightwardly or in a closing direction at a sufficiently high velocity but prevents the valve plug 101 from moving leftwardly or in an opening direction at a high velocity.

Drive means for the guide vanes 5 and means for generating the signal Es connected thereto will now be described by referring to FIGS. 5 and 6. The drive means comprises a servomotor 206 including a piston 205 having a piston rod 205A connected to operating means, not shown, for the guide vanes 5, and a cylinder 206A having the piston 205 fitted therein, and a pressure fluid distributing valve 204 to drive the servomotor 206 by supplying pressure fluid thereto.

The pressure fluid distributing valve 204 is supplied with a pressure fluid Po5 at all times and includes a plunger 203 for feeding the pressure fluid to pressure fluid lines 155 and 156 communicating with the cylinder 206. Formed in the upper portion of the plunger 203 is a servomotor section 203A having an upper side on which a pressure fluid Po4 acts and a lower side on which a pressure fluid signal $P_{GX}$ from a governor, not shown, acts. The servomotor section 203A has the function of moving the plunger 203 of the distributing valve 204 to a position which may vary depending on the signal $P_{GX}$ from the governor, and the distributing valve 204 has the function of supplying pressure fluid to the servomotor 206 at a flowrate which may vary depending on the position of the plunger 203. Thus the guide vanes 5 are opened and closed at a velocity commensurate with the position of the plunger 203. The range of upward and downward movements of the plunger 203 is restricted by the vertical movement of a disc 210 supported by a rod 203B which is interrupted by nuts 208 and 209 threadably fitted to bolts 207, as is the case with the plunger 118 of the pressure fluid distributing valve 122 described hereinabove.

The means for generating the signal Es comprises a differential transformer core 201 connected to the plunger 203 through the rod 203B, and a differential transformer coil 202. The differential transformer coil 202 detects the displacement $X_G$ of the differential transformer core 201 and generates the signal Es. As shown in FIG. 6, the displacement $X_G$ and the signal Es are fixed. That is, when the differential transformer core 201 moves to a position spaced apart downwardly from a neutral point by $\delta$, the signal Es is 0. Further downward movement of the differential transformer core 201 makes the signal Es become negative (close signal); and upward movement thereof makes the signal positive (open signal). As aforesaid, the differential transformer core 201 moves with the plunger 203 as a unit. Thus its displacement $X_G$ is equal to the displacement of the plunger 203 from its neutral position. Since the displacement of the plunger 203 from its neutral position is proportional to the velocity at which the guide vanes 5 are opened or closed, the displacement $X_G$ indicates the velocity at which the guide vanes 5 are opened or closed, after all. Thus the signal Es is a function of the velocity v at which the guide vanes 5 are opened or closed.

Operation of the aforesaid drive means will be described. Referring to FIG. 5, a reduction in the load applied to the generator causes the pressure fluid signal $P_{GX}$ from the governor to drop in value, causing the servomotor section 203A to move downwardly a distance corresponding to the drop of its value. This moves downwardly the plunger 203 connected thereto. Downward movement of the plunger 203 supplies the pressure fluid Po5 to the line 155, to move the piston 205 rightwardly to close the guide vanes 5. The velocity v at which the guide vanes 5 are closed is proportional to the displacement of the plunger 203 or the displacement $X_G$ of the differential transformer core 201. The movement of the differential transformer core 201 is detected by the transformer coil 202 which generates the signal Es. When the reduction in the load applied to the generator is high in value, the amount of downward movement $X_{G1}$ becomes larger than the bias $\delta$ as shown in FIG. 6 and the output signal Esl of the transformer coil 202 is negative in value which is a closing signal. Stated differently, when the guide vane closing velocity is higher than a predetermined value (which corresponds to the bias $\delta$), the differential transformer coil 202 generates the signal Esl for closing the throttle valve 9, which is negative in value.

Figure 4:
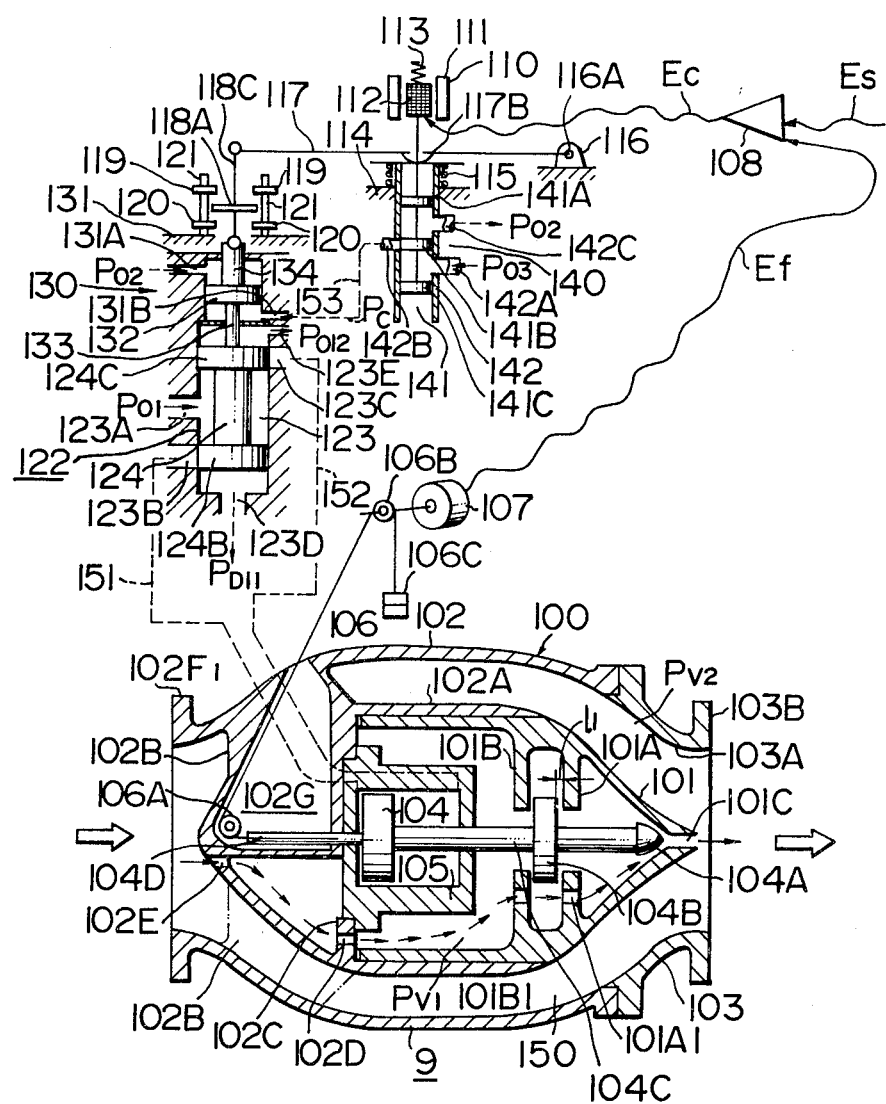
FIG. 4 is a schematic sectional view of the variable throttle valve and control means therefor used in the embodiments shown in FIGS. 1-3.

The signal Esl is supplied to the amplifier 108 shown in FIG. 4. At this time, the piston 104 of the throttle valve 9 is in the illustrated position, and the signal Ef from the potentiometer 107 is 0. The amplifier 108 amplifies the signal Esl (negative) and generates a signal Ec (negative) which causes a change to occur in the magnetic flux of the movable coil 112 and moves same downwardly an amount corresponding to the value of the signal Ec. Downward movement of the movable coil 112 is transmitted through the pilot valve 140, servomotor 130, etc., to the plunger 124 of the distributing valve 122 which is moved downwardly an amount proportional to the amount of downward movement of the movable coil 112. Downward movement of the plunger 124 brings the inlet port 123A into communication with the port 123B, to allow the pressure fluid Pol to be fed through the line 151 to the chamber of the cylinder 105 on the left side of the piston 104. The pressure fluid fed to the cylinder 105 moves the piston 104 rightwardly in FIG. 4. At initial stages of rightward movement of the piston 104, the needle 104A at the forward end of the piston rod 104C closes the opening 101C. As a result, a pressure Pv1 in the valve plug 101 becomes higher than a pressure Pv2 in the annular passage 150 because the pressure in the annular passage 150 is reduced by the stream of water. When the opening 101C is not closed, the pressure in the valve plug 101 is released therethrough, so that the valve plug 101 is low in pressure. When the pressure Pv1 is high, it promotes the rightward movement of the valve plug 101, thereby enabling the valve plug 101 to move smoothly to the right. As soon as the opening 101C is closed, the disk 104B abuts against the projection 101A and moves the valve plug 101 rightwardly, in cooperation with the pressure Pv1, to thereby throttle the annular passage 150. Thus the throttle valve 9 is actuated in the closing direction. The velocity of movement of the valve plug 101 or that of the piston 104 may vary depending on the flowrate of the pressure fluid fed through the line 151 which in turn may vary depending on the degree at which the port 123B is throttled by the land 124B. Thus the velocity of movement of the valve plug 101 is determined by the displacement of the plunger 124 which in turn is determined by the value of the signal Ec. Thus the throttle valve 9 is actuated in the closing direction at a velocity commensurate with the signal Es1 (which is determined by the velocity of movement of the guide vanes 5 in the closing direction).

Figure 5:
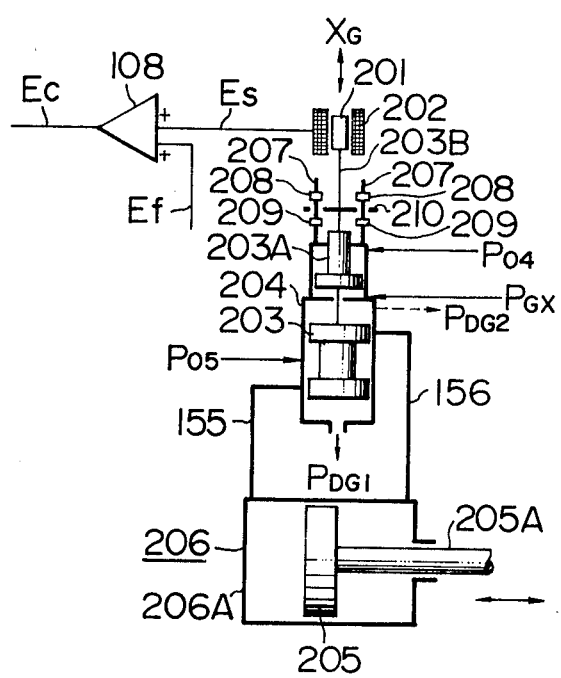
FIG. 5 is a schematic view of the guide vane actuating means and signal generating means used in the embodiments shown in FIGS. 1-3.
Figure 6:
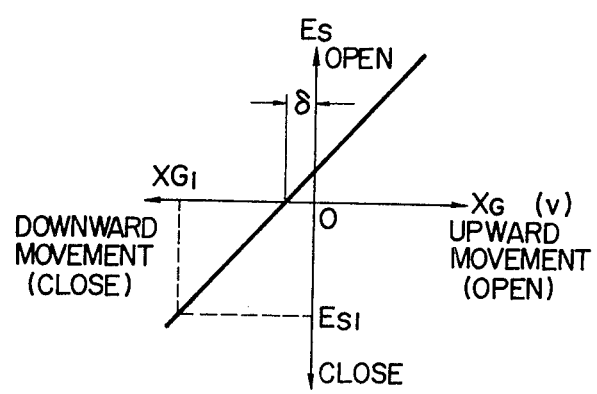
FIG. 6 is a diagram showing the characteristics of the signal generating means shown in FIG. 5.

When the guide vanes 5 are moved in the closing direction and approaches to the position corresponding to a new load after a large load reduction, the plunger 203 of the distributing valve 204 shown in FIG. 5 returns close to the neutral position and the signal Es becomes close to 0. Meanwhile movement of the piston 104 is returned as a signal Ef to the calculator-amplifier 108 through the piston rod 104D, return wire 106 and potentiometer 107. The signal Ef which is zero in value when the piston 104 is in the illustrated position in FIG. 4 has its value increased as the piston 104 moves rightwardly or the throttle valve 9 moves in the closing direction. When the sum of the feedback signal Ef and the signal Es becomes positive, the signal Ec from the calculator-amplifier 108 becomes positive in value, and the movable coil 112 is moved upwardly from the neutral position. This moves the plunger 124 of the distributing valve 122 upwardly, to allow the pressure fluid Pol to be fed through the line 152 to the chamber of the cylinder 105 on the right side of the piston 104. As the pressure fluid acts on the right side of the piston 104, the piston 104 is moved leftwardly. At initial stages of the leftward movement of the piston 104, the needle 104A at the forward end of the piston rod 104C is released from engagement in the opening 101C of the valve plug 101 to render the pressure Pv1 inside the valve plug 101 smaller than the outside pressure Pv2. Then the disc 104B on the piston rod 104C abuts against the projection 101B of the valve plug 101, to move the valve plug 101 leftwardly. At the same time the pressure difference (Pv2−Pv1) acts to help the leftward movement of the valve 101. Thus the throttle valve 9 begins to move in the opening direction. At this time, the velocity of movement of the valve plug 101 may vary depending on the displacement of the plunger 124 of the distributing valve 122 from the neutral position. Since the uppermost position of the plunger 124 is limited by the nut 119 engaging the disc 118A to a position in which a small volume of pressure fluid Pol is fed to the port 123C communicating with the cylinder 105 through the line 151, the velocity of movement of the valve plug 101 in the opening direction is low. Thus the valve plug 101 is slowly opened. After the guide vanes 5 are moved to a position in which the degree of opening reaches a desired level commensurate with the reduction in load, the plunger 203 of the distributing valve 204 fluctuates above and below the neutral position in response to a fine variation in load. As can be understood from the characteristics shown in FIG. 6, the signal Es has a positive value, and since the feedback signal Ef is supplied to the amplifier 108, the signal Ec from the amplifier 108 has a positive value in any steady state. Thus the throttle valve 9 is slowly returned to the full open position. It is to cause the throttle valve 9 to stand by to cope with an increase in load again that the throttle valve 9 is returned to the full open position. To open the throttle valve 9 slowly has the effect of reducing fluid hammer that might be produced in the vicinity of the guide vanes 5 by quickly returning the flowrate to the original value after reducing same by the rightward movement of the valve plug 101.

During steady state operation of the hydraulic turbines, the pressure fluid signal $P_{GX}$ from the governor shows a variation commensurate with a change in load, thereby moving the plunger 203 of the distributing valve 204 shown in FIG. 5 upwardly and downwardly of its neutral position. The amount of downward movement is smaller than the bias $\delta$ shown in FIG. 6 at this time, so that the differential transformer coil 202 generates the signal Es of positive value or an opening signal at all times. Thus the throttle valve 9 is maintained in the full open position at all times.

In this embodiment, to return the throttle valve 9 to the full open position, the position of the piston 104 of the throttle valve 9 is inputted to the calculator-amplifier 108 as a feedback signal Ef. This feedback circuit may be dispensed with. As shown in FIG. 6, the signal Es has a positive value when the displacement $X_G$ is zero. Thus when the degree of opening of the guide vanes 5 is stabilized following sudden throttling of the guide vanes 5 to a predetermined degree of opening, the signal Es has a positive value. The signal Es of positive value moves the movable coil 112 upwardly, to enable the throttle valve 9 to be restored to the full open position.

In the embodiment shown and described hereinabove, a signal concerned in the operation for closing the guide vanes 5 is generated by detecting the position of the plunger 203 of the distributing valve 204 of the drive means for the guide vanes 5. It is to be understood that the invention is not limited to this specific form of embodiment and that the movement of the guide vanes 5 may be directly detected. Also, a signal concerned in the closing operation of the guide vanes 5 may be obtained by using a pressure signal from the governor for controlling the guide vanes 5.

In the description of one embodiment of the invention set forth hereinabove, the movable throttle valve of the construction shown in FIG. 4 has been described. However, the invention is not limited to this movable throttle valve, and any member, such as of the same construction as guide vanes mounted in the annular passage of a tubular turbine, may be used instead, so long as such member is capable of controlling the flowrate in a fluid channel.

Depending on the degree of changes in load, the degree at which the movable throttle valve operates by following up the closing operation of the guide vanes may be varied. For example, when the reduction in load is small in value, the throttle valve may be actuated about ½ the amount of closure of the guide vanes, and when the reduction in load is large in value, the throttle valve may be actuated to the same degree as the guide vanes are closed.

To cope with any failure of the throttle valve to function normally, means may be separately provided for monitoring the fluid channel to detect any change in the pressure and to control the velocity of operation of the guide vanes when any abnormal signs are observed.

According to the invention, a rise in the pressure of water in the fluid channel that might occur when the guide vanes are suddenly closed during operation of a hydraulic turbine can be effectively avoided. The invention is economical because it only uses a variable throttle valve which is much lower in expenses than the civil engineering work that might be performed to solve the same problem.

In the above description, a throttling action is imparted to the stream upstream or downstream of the guide vanes in response to the rapid closing of the guide vanes, in order to prevent rapid changes in hydraulic pressure. This concept is applicable on such a case where the guide vanes are rapidly opened. More particularly, the throttling action may be imparted to the stream upstream or downstream of the guide vanes in response to the rapid opening of the guide vanes.

What is claimed is:

1. A method of controlling a hydraulic turbine during its operation in a system including an upper water reservoir, a lower water reservoir, a water channel connecting the upper reservoir and the lower reservoir together, a hydraulic turbine connected in the water channel to be operated by the water passing through the channel and the turbine including guide vanes to control the quantity of water passing through the turbine to thereby control the operation of the turbine, and a load to be powered by the turbine wherein such method comprises the steps of:

drivingly connecting the turbine to the load;

passing water through the turbine under the control of the guide vanes to operate the turbine and thereby drive the connected load;

sensing a change in the load while the operating turbine is driving the load;

adjusting the guide vanes in response to the sensed change in load to thereby correspondingly adjust the flow of the water through the turbine in accordance with the change in the load, which adjusting the guide vanes produces a corresponding change in pressure on the upstream side of the turbine in the water channel and on the downstream side of the turbine in the water channel;

providing a control signal correlated to the adjusting rate of the guide vanes and rate of pressure changes in the water channel caused thereby;

throttling the water flowing in the water channel at a distance spaced serially in the water channel from the turbine and at a rate correlated to the rate of the guide vanes, only when the control signal indicates an adjusting rate of the guide vanes that is higher than a reference rate, so that said throttling is automatic and simultaneous with said adjusting and said throttling will reduce the severity of the pressure change within the water channel on the side of the turbine in common with the throttling; and discontinuing said throttling in response to the signal indicating an adjusting rate of the guide vanes lower than a reference rate.

2. The method according to claim 1, wherein said throttling is conducted between the upper reservoir and the turbine.

3. The method according to claim 2, wherein said throttling is conducted adjacent the upper reservoir.

4. The method according to claim 1, wherein said throttling is conducted between the turbine and the lower reservoir.

5. The method according to claim 4 wherein said throttling is conducted adjacent to the lower reservoir.

6. The method according to claim 1 wherein said step of throttling is conducted during closing of the guide vanes.

7. The method according to claim 1 wherein said step of throttling is conducted during opening of the guide vanes.

8. The method according to claim 1 wherein said step of discontinuing is conducted at a rate less than that which would by itself produce a control signal greater than the throttling reference signal.

9. The method according to claim 8 wherein said step of throttling produces a pressure drop at least as great as the pressure drop produced by said step of adjusting.

10. The method according to claim 9 wherein said throttling reference signal is sufficient to prevent throttling during steady state adjusting of said guide vanes.

11. The method according to claim 8 wherein said throttling reference signal is sufficient to prevent throttling during steady state adjusting of said guide vanes.

12. The method according to claim 1 wherein said step of throttling is conducted simultaneously at serially spaced locations within the water channel on the same side of the turbine.

13. The method according to claim 1 wherein said step of throttling produces a pressure drop at least as great as the pressure drop produced by said step of adjusting.

14. The method according to claim 13 wherein said throttling reference signal is sufficient to prevent throttling during steady state adjusting of said guide vanes.

15. The method according to claim 1 wherein said throttling reference signal is sufficient to prevent throttling during steady state adjusting of said guide vanes.

16. A control apparatus for controlling a hydraulic turbine during its operation in a system including an upper water reservoir, a lower water reservoir, a water channel connecting the upper reservoir and the lower reservoir together, a hydraulic turbine connected in the water channel to be operated by the water passing through the channel and the turbine including guide vanes to control the quantity of water passing through the turbine to thereby control the operation of the turbine, and a load to be powered by the turbine wherein such apparatus comprises:

means drivingly connecting the turbine to the load;

means passing water through the turbine under the control of the guide vanes to operate the turbine and thereby drive the connected load;

means sensing a change in the load while the operating turbine is driving the load;

means adjusting the guide vanes in response to the sensed change in load to thereby correspondingly adjust the flow of the water through the turbine in accordance with the change in the load, which adjusting the guide vanes produces a corresponding change in pressure on the upstream side of the turbine in the water channel and on the downstream side of the turbine in the water channel;

means providing a control signal correlated to the adjusting rate of the guide vanes and rate of pressure changes in the water channel caused thereby;

means throttling the water flowing in the water channel at a distance spaced serially in the water channel from the turbine and at a rate correlated to the rate of the guide vanes, only when the control signal indicates an adjusting rate of the guide vanes that is higher than a reference rate, so that said throttling is automatic and simultaneous with said adjusting, and said throttling will reduce the severity of the pressure change within the water channel on the side of the turbine in common with the throttling; and means discontinuing said throttling in response to the signal indicating an adjusting rate of the guide vanes lower than a reference rate.

17. The apparatus according to claim 16, wherein said throttling means is between the upper reservoir and the turbine.

18. The apparatus according to claim 17, wherein said throttling means is adjacent to the upper reservoir.

19. The appoaratus according to claim 16, wherein said throttling means is between the turbine and the lower reservoir.

20. The apparatus according to claim 19 wherein said throttling means is adjacent to the lower reservoir.

21. The apparatus according to claim 16, including a plurality of said throttling means at serially spaced locations within the water channel on the same side of the turbine.

22. The apparatus according to claim 21, wherein said throttling means produces a pressure drop at least as great as the pressure drop produced simultaneously by said adjusting means.

23. The apparatus according to claim 22, wherein said throttling means reference signal is sufficient to prevent throttling by said throttling means during steady state adjusting of said guide vanes.

24. The apparatus according to claim 16, wherein said throttling means produces a pressure drop at least as great as the pressure drop produced simultaneously by said adjusting means.

25. The apparatus according to claim 24, wherein said throttling means reference signal is sufficient to prevent throttling by said throttling means during steady adjusting of said guide vanes.

26. The apparatus according to claim 16, wherein said throttling means reference signal is sufficient to prevent throttling by said throttling means during steady adjusting of said guide vanes.

* * * * *